United States Patent
Oswald et al.

(10) Patent No.: US 7,282,900 B2
(45) Date of Patent: Oct. 16, 2007

(54) PERFORMANCE CONTROLLER FOR A STEP DOWN CURRENT MODE SWITCHING REGULATOR

(75) Inventors: Richard K. Oswald, San Jose, CA (US); Tamotsu Yamamoto, Cupertino, CA (US); Takashi Ryu, Kyoto (JP); Mikio Motomori, Osaka (JP); Takuya Ishii, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 35 days.

(21) Appl. No.: 11/206,977

(22) Filed: Aug. 19, 2005

(65) Prior Publication Data

US 2006/0044853 A1    Mar. 2, 2006

Related U.S. Application Data

(60) Provisional application No. 60/604,012, filed on Aug. 25, 2004.

(51) Int. Cl.
*G05F 1/40* (2006.01)

(52) U.S. Cl. .................... 323/282; 323/283; 363/25

(58) Field of Classification Search ............... 323/282, 323/288, 222, 290, 268, 259; 363/125, 127, 363/89, 37, 45, 25, 24
See application file for complete search history.

(56) References Cited

U.S. PATENT DOCUMENTS

| | | | |
|---|---|---|---|
| 4,378,530 A | 3/1983 | Garde | |
| 4,727,308 A | 2/1988 | Huljak et al. | |
| 4,943,902 A | 7/1990 | Severinsky | |
| 4,959,606 A | 9/1990 | Forge | |
| 5,305,192 A | 4/1994 | Bonte et al. | |
| 5,479,090 A | 12/1995 | Schultz | |
| 5,600,234 A | 2/1997 | Hastings et al. | |
| 5,903,447 A | 5/1999 | Takahashi et al. | |
| 5,905,407 A | 5/1999 | Midya | |
| 5,929,620 A | 7/1999 | Dobkin et al. | |
| 5,949,229 A | 9/1999 | Choi et al. | |
| 5,982,160 A | 11/1999 | Walters et al. | |
| 6,034,517 A | 3/2000 | Schenkel | |
| 6,046,516 A | 4/2000 | Maier et al. | |

(Continued)

*Primary Examiner*—Rajnikant B. Patel
(74) *Attorney, Agent, or Firm*—McDermott Will & Emery LLP

(57) ABSTRACT

A method of regulating an output voltage by utilizing a switching regulator, where the switching regulator includes a high side switch, a low side switch having an active diode, a controller coupled to the high side switch and the low side switch, and a current measuring circuit coupled to the high side switch. The method includes the steps of: measuring the output voltage and if the output voltage is below a desired level, activating the high side switch so as to provide current to a load capacitor via a load inductor, if the voltage is above the desired level, activating the low side switch so as to sink current from the load capacitor via the load inductor; and utilizing the current measuring circuit to measure the current flowing through the high side switch in either a positive direction or a negative direction, where the controller is operable for controlling the current measuring circuit and disabling active components contained in the current measuring circuit and the active diode when the active components are not utilized during operation of the switching regulator so as to reduce operational power requirements of the switching regulator.

30 Claims, 4 Drawing Sheets

U.S. PATENT DOCUMENTS

| | | |
|---|---|---|
| 6,066,943 A | 5/2000 | Hastings et al. |
| 6,166,528 A * | 12/2000 | Rossetti et al. ............. 323/283 |
| 6,222,356 B1 | 4/2001 | Taghizadeh-Kaschani |
| 6,268,756 B1 | 7/2001 | Nayebi et al. |
| 6,307,356 B1 | 10/2001 | Dwelley |
| 6,313,610 B1 | 11/2001 | Korsunsky |
| RE37,609 E * | 3/2002 | Bittner ....................... 323/272 |
| 6,366,070 B1 | 4/2002 | Cooke et al. |
| 6,404,261 B1 | 6/2002 | Grover et al. |
| 6,476,589 B2 | 11/2002 | Umminger et al. |
| 6,498,466 B1 | 12/2002 | Edwards |
| 6,509,721 B1 | 1/2003 | Liebler |
| 6,522,178 B2 | 2/2003 | Dubhashi et al. |
| 6,541,947 B1 | 4/2003 | Dittmer et al. |
| 6,611,131 B2 | 8/2003 | Edwards |
| 6,724,174 B1 | 4/2004 | Esteves et al. |
| 6,744,241 B2 | 6/2004 | Feldtkeller |
| 6,825,726 B2 * | 11/2004 | French et al. ............... 330/297 |
| 6,828,766 B2 | 12/2004 | Corva et al. |
| 6,873,140 B2 | 3/2005 | Saggini et al. |
| 6,894,471 B2 | 5/2005 | Corva et al. |
| 7,030,596 B1 | 4/2006 | Salerno et al. |
| 2003/0025484 A1 | 2/2003 | Edwards |

* cited by examiner

PERFORMANCE CONTROLLER FOR A STEP DOWN CURRENT MODE SWITCHING REGULATOR

CLAIM OF PRIORITY

This patent application, and any patent(s) issuing therefrom, claim priority to U.S. provisional patent application No. 60/604,012, filed on Aug. 25, 2004, which is incorporated herein by reference in its entirety.

FIELD OF THE INVENTION

The present invention relates to an improved step down current mode switching regulator, as well as a method for controlling the step down current mode switching regulator, which provides for high efficiency operation even under small load current conditions.

BACKGROUND OF INVENTION

The use of current mode switching regulators as a means of providing a predetermined and substantially constant output voltage to a varying load from a fluctuating voltage source is well known. An example of such a current mode switching regulator can be found in book by Erickson and Maksimovic, titled "Fundamentals Of Power Electronics," 2d Edition, Kluwer Academic Publishers, pp. 439-441, (2001).

As is also known, in order to meet stringent efficiency requirements (such as in portable battery operated devices, e.g., cell phones) utilizing a trailing edge current mode switching regulator, component and parameter values are chosen to obtain acceptable ripple at moderate to full load currents. In such a switching regulator, the recirculating device (i.e., low side switch) is typically an active, low voltage drop switch instead of a passive diode in order to improve efficiency. The designs of the known switching regulators usually result in continuous inductor current at all times, which allows for good load voltage regulation and transient response all the way to zero load current and even somewhat negative current (i.e., sinking instead of just sourcing) if required. However, at small load currents, such continuous current operation lowers efficiency due to the relatively large magnitude and duration currents in the switches, inductor and capacitor even when the average load current is near zero. As there is a continuing quest to extend battery life, for example, by the manufacturers of portable devices, there is a need to prevent the efficiency reduction when operating at small load currents. Accordingly, there exists a need to overcome the foregoing problem and to provide a step down current mode switching regulator, which provides for improved efficiency even at small load current conditions, in a cost effective manner.

SUMMARY OF THE INVENTION

In view of the foregoing, it is a primary objective of the invention to provide a novel step down current mode switching regulator which eliminates the foregoing problem associated with the reduction in efficiency due to continuous current flowing in the recirculating device during operation at small load currents.

According to one embodiment of the present invention, the switching regulator comprises a high side switch; a low side switch including an active diode; a controller coupled to the high side switch and the low side switch, where the controller governs the operational state of the high side switch and the low side switch during operation of the switching regulator based on measured values of the output voltage; and a current measuring circuit coupled to the high side switch, which is capable of measuring current flowing through the high side switch in both a positive and a negative direction.

The present invention also relates to a method of regulating an output voltage by utilizing a switching regulator, where the switching regulator includes a high side switch, a low side switch having an active diode, a controller coupled to the high side switch and the low side switch, and a current measuring circuit coupled to the high side switch. The method includes the steps of: measuring the output voltage and if the output voltage is below a desired level, activating the high side switch so as to provide current to a load via a load inductor, and if the voltage is above the desired level, activating the low side switch so as to sink current from the load capacitor via the load inductor; and utilizing the current measuring circuit to measure the current flowing through the high side switch in either a positive direction or a negative direction, where the controller is operable for controlling the current measuring circuit and disabling active components contained in the current measuring circuit and the active diode when the active components are not utilized during operation of the switching regulator so as to reduce operational power requirements of the switching regulator.

The switching regulator of the present invention provides numerous advantages over the prior art. One advantage of the present invention is that it provides a cost effective switching regulator that allows for operation at small load currents without a significant reduction in efficiency. This is accomplished in-part by utilizing an active diode function including control and sense signals in place of the synchronously driven low-side switch found in typical prior art devices.

Another advantage of the present invention is that it allows for numerous of the active components contained therein to be powered-off during the operation cycle thereby reducing the power requirements and further improving overall efficiency.

Yet another advantage of the present invention is the capability of both sourcing and sinking load current during transients caused by changing the value of desired output voltage, by utilizing only a high side current sense circuit that responds to both positive and negative currents and a controller that does not require continuous inductor current at light load steady state operation to improve efficiency.

Additional objects, advantages, and novel features of the invention will become apparent to those skilled in the art upon examination of the following description, or may be learned by practice of the invention. While the novel features of the invention are set forth below, the invention, both as to organization and content, will be better understood and appreciated, along with other objects and features thereof, from the following detailed description taken in conjunction with the drawings.

BRIEF DESCRIPTION OF THE DRAWINGS

The accompanying drawings, which are incorporated into and form a part of the specification, illustrate several aspects and embodiments of the present invention and, together with the general description given above and detailed description given below, serve to explain the principles of the invention.Such description makes reference to the annexed drawings.

The drawings are only for the purpose of illustrating preferred embodiments of the invention and are not to be treated as limiting the invention.

In the drawings:

FIG. 1 illustrates a step down current mode switching regulator which utilizes an active diode as the low-side device in accordance with the present invention.

FIG. 2 illustrates a schematic block diagram of an exemplary active diode for use in the present invention.

FIG. 3 illustrates a schematic block diagram of an exemplary step down current mode switching regulator in accordance with the present invention.

FIG. 4 is an exemplary state diagram/flow chart describing the operation of the novel switching regulator and controller of the present invention.

FIGS. 5a-5e illustrate exemplary inductor currents for two successive control cycles for the various load conditions discussed above.

Throughout the above-mentioned drawings, identical reference numerals are used to designate the same or similar component parts.

DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein: rather, these embodiments are provided so that this disclosure will be thorough and complete, and will fully convey the scope of the invention to those skilled in the art, like numbers refer to like elements throughout.

In accordance with a first embodiment of the present invention, the synchronously driven low-side device of a typical current mode switching regulator is replaced with an "active" diode. An active diode utilized in the present invention is substantially described in a previously filed provisional application Ser. No. 60/557,694, filed on Mar. 31, 2004 titled "Active Diode Circuit". It is noted, however, the active diode utilized in the present invention is slightly modified to allow for additional control terminals, which as described below, in-part facilitate the increase in performance provided by the switching regulator of the present invention.

Figure 1:
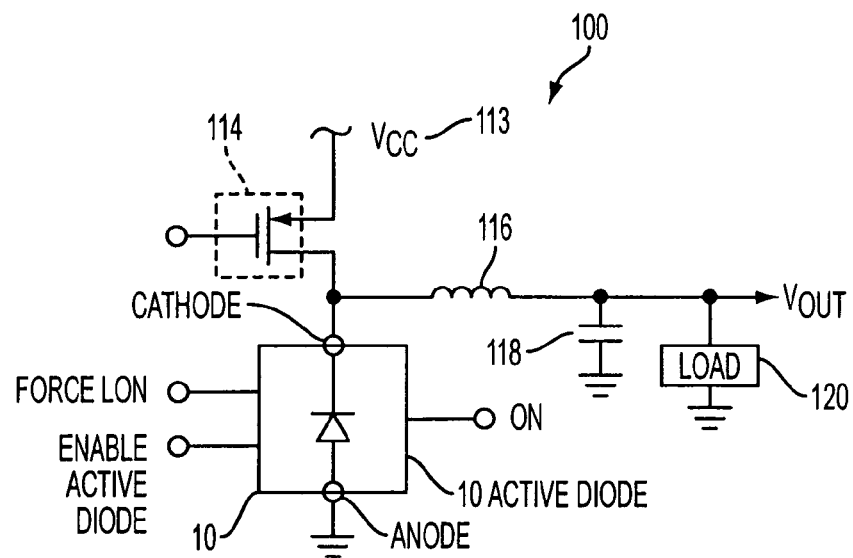

As shown in FIG. 1, the active diode 10 replaces the low-side device in a typical current mode switching regulator 100. The cathode terminal of the diode 10 is coupled to the drain terminal of a PMOS transistor 114 operating as the high-side device. The anode terminal of the diode 10 is coupled to ground. The source terminal of the PMOS transistor 114 is coupled to a voltage source 113, and the gate terminal of the PMOS transistor 114 receives a control signal which functions to govern the activation of the PMOS transistor 114. The switching regulator 100 also includes an inductor 116 and a capacitor 118 coupled between the active diode 10 and the PMOS transistor 114 as shown in FIG. 1, and a load 120 placed in parallel with capacitor 118, to which the voltage $V_{OUT}$ is applied. The active diode 10 also includes three additional control terminals, which are referred to as FORCE $L_{ON}$, ENABLE ACTIVE DIODE and ON. As explained below, these additional control terminals allow for additional control of the active diode 10, and facilitate the improved performance of the switching regulator of the present invention.

Figure 2:
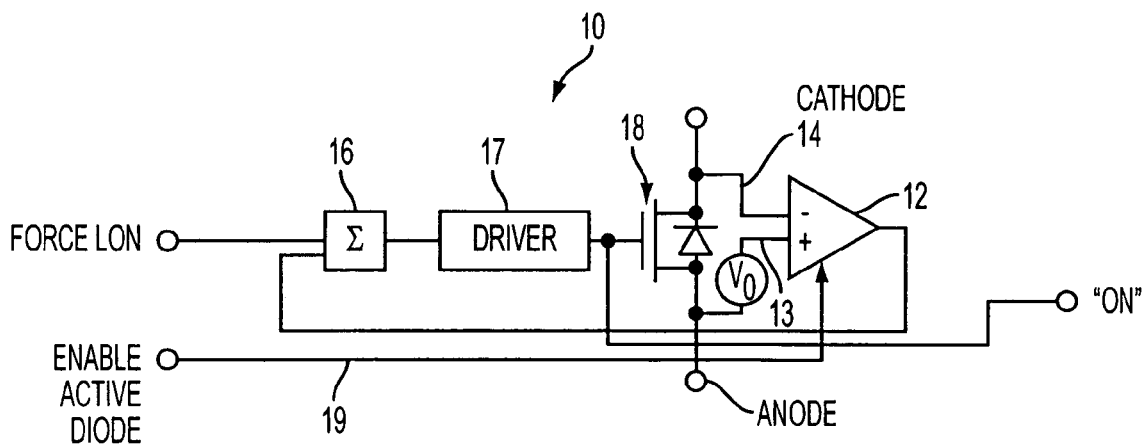

FIG. 2 illustrates an exemplary design of the active diode 10 illustrated in FIG. 1. As shown in FIG. 2, the active diode 10 includes a transistor 18, which corresponds to the low-side switch of prior art regulators and additional circuitry for controlling the operation of transistor 18. More specifically, the active diode 10 further includes an amplifier 12 having an inverting input terminal 14 coupled to the cathode terminal of the active diode 10, and a non-inverting input terminal 13 which is coupled to an offset voltage source Vo. The opposite end of the offset voltage source Vo couples to the anode terminal of the active diode 10. In addition, the active diode 10 comprises a summer 16, which receives a signal FORCE $L_{ON}$ as a first input, and the output of the amplifier 12 as a second input. The output of the summer 16 is coupled to a driver 17, the output of which functions to control the operation of transistor 18. The active diode 10 further includes an ENABLE ACTIVE DIODE input signal 19, which functions to activate or deactivate the amplifier 12. The output of the driver 17 is also utilized as an output status signal "ON", which indicates the state of the active diode 10 (i.e., conducting or non-conducting).

In operation, the active diode 10 has a small voltage drop nominally equal to Vo, which is chosen to be just larger than the maximum voltage offset of amplifier 12. Transistor 18 is the conductive element but, as noted, active diode 10 has an independent control input (i.e., FORCE $L_{ON}$) as well as an internal voltage monitoring feedback control output (i.e., output of amplifier 12) as opposed to being synchronously driven "ON" when the high side switch is "OFF" as is done in prior art devices. The output from the amplifier 12, which operates as a measuring circuit, corresponds to an amplified version of the voltage between the cathode and anode terminals. It is noted that amplifier 12 can be gated off by the regulator controller (not shown in FIG. 2) through deactivation of the ENABLE ACTIVE DIODE input signal, which is coupled to the amplifier 12, to save power when the active diode is not being utilized by the switching regulator.

When the ENABLE ACTIVE DIODE signal is asserted by the regulator controller, the amplifier 12 is active. When amplifier 12 is active, transistor 18 may be conducting, and a linear negative feedback loop is established that emulates passive diode operation but with a very small forward voltage drop, Vo. At this time, the output status signal "ON" is also TRUE (i.e., logic high) indicating that the active diode 10 is active (i.e., conducting). It is noted that |Vo|>|$V_{OFFSET}$| is required to ensure that the feedback loop is stable, where $V_{OFFSET}$ represents the offset voltage of the amplifier 12.

When the amplifier 12 is enabled and the "FORCE $L_{ON}$" control signal is inactive, the loop becomes positive feedback at diode current reversal, and the output of the amplifier 12 goes to a low voltage, which functions to reduce the output of the driver 17 to a logic low, thereby turning off transistor 18, and de-asserting the output status signal "ON". It is also possible to force transistor 18 to the conducting state, notwithstanding the output of the amplifier 12, by activating the Force LON signal. As shown in FIG. 2, the Force LON signal is coupled to the driver 17 via the summer 16. When FORCE $L_{ON}$ is asserted, the output of driver 17 is logic TRUE and transistor 18 is conducting (for either direction of current).

It is noted that by utilizing the foregoing active diode as the low side device, the switching regulator of the present invention can operate in a discontinuous current mode at small average load currents, which not only eliminates conduction current losses in the switches and output filter components L and C but also by use of the ENABLE ACTIVE DIODE logic signal, which permits the disabling of the amplifier 12 when not being used by the control sequencer, to also reduce the quiescent current and further improve overall efficiency of the device.

Figure 3:
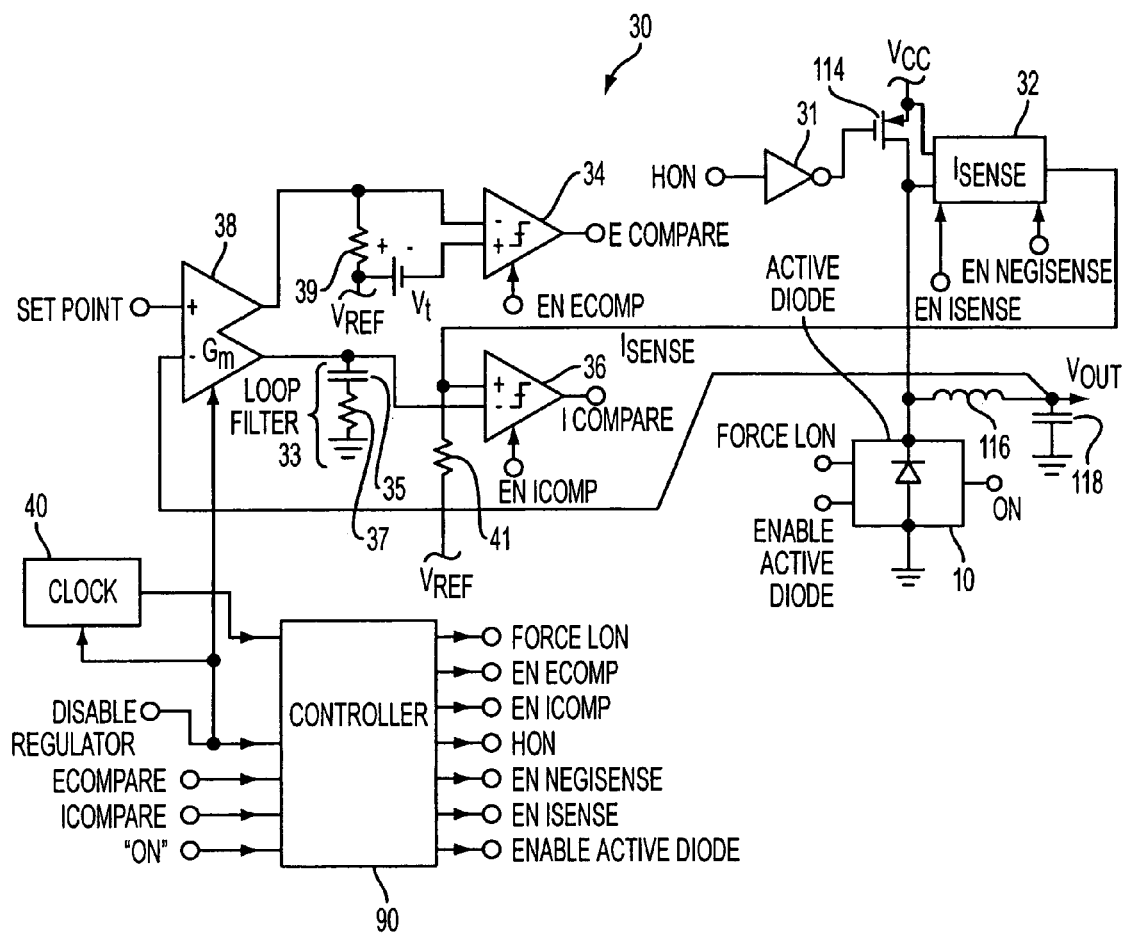

FIG. 3 illustrates a schematic block diagram of an exemplary step down current mode switching regulator 30 in accordance with the present invention, which includes the active diode 10 illustrated in FIG. 2. Referring to FIG. 3, the switching regulator 30 includes a PMOS transistor 114 operating as the high side device, the active diode 10 operating as the low side device, an inductor 116 and a load capacitor 118. These elements are coupled together in the same manner as discussed in the above description regarding FIG. 1. The switching regulator 30 further comprises a current sensing circuit 32 coupled to the drain and source terminals of the PMOS transistor 114, which is capable of sensing both positive and negative current flow in the high side switch 114. A control signal $H_{ON}$ is provided to the gate of the PMOS switch 114 via an inverting driver 31, and governs the opening and closing of the high-side PMOS switch 114. The switching regulator 30 also includes a first comparator 34, referred to as $E_{COMPARATOR}$, and a second comparator 36, referred to as $I_{COMPARATOR}$, an error amplifier 38, and a clock 40. It is noted that, although not shown, the gate terminal of the PMOS switch 114 would be coupled to the sensing circuit 32 so as to provide a signal for controlling components within the sensing circuit 32, such as replica devices.

As shown in FIG. 3, in the given embodiment, the error amplifier 38 receives $V_{OUT}$ as a first input and a set point voltage as a second input, and outputs two identical current signals indicative of the difference between the set point voltage and $V_{OUT}$. It is noted that the current outputs of the error amplifier need not be identical to each other, but must be proportional to one another. It is also noted that the set point voltage represents the desired output voltage level, and can be variable and adjustable on a cycle to cycle basis, if necessary. For example, when utilized in a cell phone, the desired output power level continually varies in accordance with the user's proximity to a cell station. In such a situation, the set point would vary in accordance with changing output power level requirements.

Continuing, one output of the error amplifier 38 is coupled to one input of the first comparator 34 and resistor 39, and the second output is coupled to one input of the second comparator 36 and a loop filter 33, which includes, for example, a capacitor 35 and resistor 37 coupled in series with one another. As explained further below, the error amplifier 38 is active in all states of the switching regulator when it is operating, but is powered off and the controller logic is forced to the "IDLE" state of operation by the global DISABLE REGULATOR control signal.

Referring again to FIG. 3, the second input of the first comparator 34 is coupled to a reference voltage $V_{REF}$ via an offset voltage $V_T$. In addition, a resistor 39 is coupled between $V_{REF}$ and the first input terminal of the first comparator 34 as shown in FIG. 3. It is noted that $V_{REF}$ is fixed for the given application that the regulator is being utilized in. The second input of the second comparator 36 is coupled to the output of the current sensing circuit 32 and $V_{REF}$ via resistor 41. The first comparator 34 and second comparator 36 receive control signals EN ECOMP and EN ICOMP from controller 90, respectively, which operate to enable/disable the respective comparators at appropriate times during operation as explained below. The current sensing circuit 32 also receives control signals EN ISENSE and EN NEGISENSE from the controller 90. The operation of the switching regulator of FIG. 3 is now discussed in detail with reference to the exemplary logic state diagram/flow chart of FIG. 4, which illustrates the various operational states of the switching regulator 30.

The controller 90, which is also shown in FIG. 3, functions to control the operation of the switching regulator 30. As shown in FIG. 3, the controller 90 receives various input signals, including the $E_{COMPARE}$ output of the first comparator 34, the $I_{COMPARE}$ output of the second comparator 36, the "ON" signal output from the active diode 10, a DISABLE REGULATOR signal, and a clock signal from clock 40, from the switching regulator 30 and generates various output signals, including FORCE $L_{ON}$, EN ECOMP, EN ICOMP, $H_{ON}$, EN NEGISENSE, EN ISENSE and ENABLE ACTIVE DIODE, which are coupled to the switching regulator 30 and which function to control the operation of the device. As would be clear to those skilled in the art, there are various ways of implementing such a controller, for example, one could utilize a microprocessor. Alternatively, it is also possible to implement the controller 90 utilizing a dedicated circuit. The controller 90 functions to generate control signals and transition the switching regulator to the various modes of operation as discussed below in conjunction with FIG. 4, which is a state diagram illustrating the operation of the device. It is noted that further details of the controller 90 are omitted as the implementation thereof could be readily performed by those of skill in the art in view of the state diagram of FIG. 4.

Figure 4:
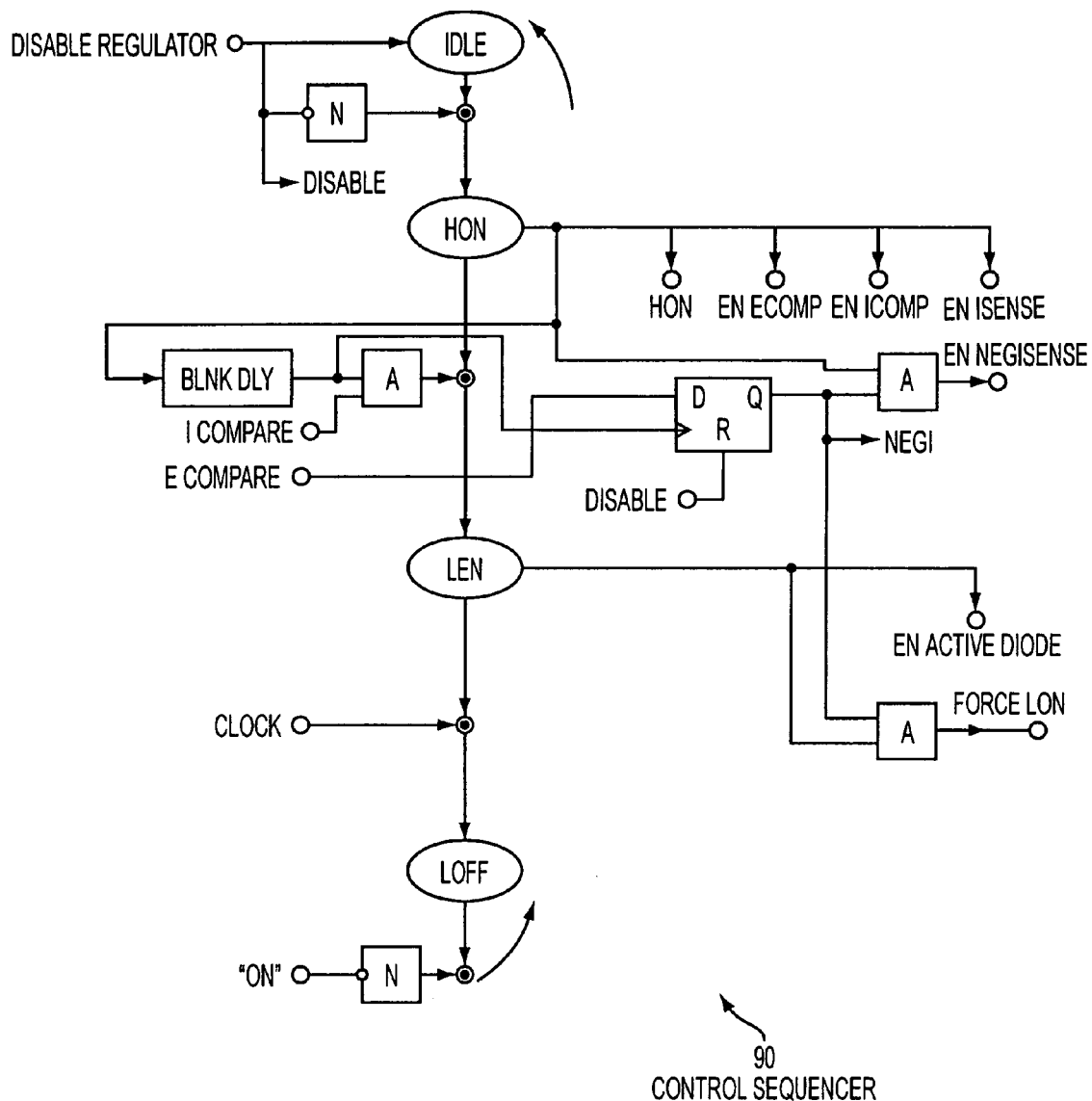

Referring to FIG. 4, in the IDLE state, the switching regulator 30 is in a standby or disabled mode. In IDLE and $L_{OFF}$ modes, active diode 10, the first comparator 34, the second comparator 36, the current sensing circuit 32 and high side switch 114 are all disabled (i.e., turned off). In addition, in $L_{EN}$ mode all of the aforementioned expect the active diode 10 are disabled. As stated above, the operation of the switching regulator 30 is cyclic, and the duration of a given cycle or clock period is determined by the clock 40 and the controller 90, which operate to generate various control signals each cycle. These control signals facilitate transitioning the switching regulator 30 between the various operational states in the following manner.

Assuming the "Disable Regulator" control signal is deasserted, the switching regulator 30 transitions to the "$H_{ON}$" state, in which control signals $H_{ON}$, EN ECOMP, EN ICOMP and ENISEN are made active (logic TRUE) by the controller 90. $H_{ON}$ active causes the high-side PMOS switch 114 to turn on. Control signals EN ECOMP, EN ICOMP and ENISEN enable the first comparator 34, the second comparator 36 and the current sensing circuit 32, respectively. It is noted that the error amplifier 38 is always on unless the entire regulator is disabled. In the $H_{ON}$ state, the high-side PMOS switch 114 is closed and the current from the voltage Supply, $V_{SUPPLY}$, through the inductor 116 is increasing. The $I_{SENSE}$ part of the current measuring circuit 32 is active during this state and is measuring the amount of current flowing from $V_{SUPPLY}$ through the high-side PMOS switch 114.

Assuming $V_{OUT}$ is near the set point (which as indicated above is the desired output voltage), the output of the first comparator 34, referred to as "E COMPARE", is logic FALSE because the output of the error amplifier 38, which measures the difference between $V_{OUT}$ and the setpoint, does not exceed $V_T$, a noise rejection threshold chosen to ignore normal variations in $V_{OUT}$, but assert on rapid decrease in the set point. As such, after the predetermined delay period effected by the controller 90, which is indicated by BLNK DLY in FIG. 4, and which is necessary to reject transients while the high side PMOS switch 114 turns ON, the controller 90 implements a D-FF function, wherein the data input of the D-FF receives the E COMPARE signal, the D-FF is clocked, and the output of the D-FF, Q, holds the value of E COMPARE (FALSE in this case) when $H_{ON}$ state was entered. As a result, signal EN NEGISENSE is FALSE as shown in FIG. 4. It is noted that signal EN NEGISENSE is TRUE when both signals $H_{ON}$ and the output of D-FF are TRUE. Signal NEGI is TRUE when the output of the D-FF is TRUE indicating negative inductor current must flow during LEN to reduce a $V_{OUT}$ that is larger than the set point.

As noted above, in the $H_{ON}$ state, the high side PMOS switch 114 is ON and the current from the supply, $V_{CC}$ (also referred to as $V_{SUPPLY}$ or $V_{IN}$) through the inductor 116 to the load is increasing. The current continues to increase until a scaled fraction of the sensed current, ISENSE, times Rs becomes greater than the loop filter voltage, which is essentially equal to the integrated output of the error amplifier. In other words, the current increases until it exceeds a value proportional to the difference between the set point and $V_{OUT}$. At this time, the output of the second comparator 36, referred to as I COMPARE, goes TRUE and the switching regulator 30 advances to the "$L_{EN}$" state, which is the low side enable state. As shown in FIG. 4, the combination of the $H_{ON}$ state signal and the I COMPARE signal being TRUE function to transition the switching regulator 30 to the $L_{EN}$ state. It is noted that $I_{SENSE}$ current signal generated by the current measuring circuit 32, which represents the amount of current flowing through the high side switch 114, will be positive for a positive inductor current and negative for a negative inductor current.

Upon entering the $L_{EN}$ state, the controller 90 functions to make the EN ACTIVE DIODE signal TRUE, thereby enabling the active diode 10. Once the active diode 10 is enabled, in this case the positive inductor current begins recirculating in the active diode 10 and decreasing toward zero. At small loads the inductor current reaches zero and the active diode 10 becomes non-conducting. It is noted that as described above, once the recirculating current approaches approximately zero, the active diode 10 functions to turn itself off (i.e., makes transistor 18 non-conducting). Regardless of the state of the active diode 10, the switching regulator 30 will wait in the LEN state until the next clock pulse is received before transitioning to the $L_{OFF}$ state. As noted above, the switching regulator 30 of the present invention is a clocked device, and the period of time for one operation cycle of the device is determined by the selected clock period, which is predetermined by the circuit designer. As is known, the length of the clock cycle utilized would depend upon the given application in which the switching regulator is being utilized. Once in the $L_{OFF}$ state, which makes the EN ACTIVE DIODE signal FALSE, disables the amplifier 12 and turns off the transistor 18 of the active diode 10, the controller 90 confirms that the active diode is in the OFF state. Once the logic level of the "ON" signal indicates the state of the active diode has become OFF, if it is not off already, the switching regulator 30 returns to the IDLE state, and the foregoing cycle is repeated with the transition to the $H_{ON}$ state, unless DISABLE REGULATOR is true.

Returning again to the switching regulator 30 operating in the $L_{EN}$ state, contrary to the foregoing scenario, if the load current is sufficiently large such that it does not reach zero prior to receipt of the next clock pulse (continuous current mode operation), the switching regulator 30 transitions to $L_{OFF}$ at the next clock pulse, and the active diode 10 is turned off by making the ENABLE ACTIVE DIODE signal FALSE. Once the "ON" signal indicates that the active diode is OFF, the switching regulator 30 returns to the IDLE state, and the foregoing cycle is repeated. It is noted that the function of the $L_{OFF}$ state is to prevent shoot-through in CCM.

Thus, in the "$L_{OFF}$" state, the active diode 10 is either already OFF because the recirculate current is not positive (discontinuous current mode) or is turning OFF because signal EN ACTIVE DIODE is not asserted (continuous current mode), and when the active diode 10 is non-conducting, signal ON is deasserted and the state advances to "IDLE" and the cycle repeats.

Further, in the event that the load suddenly decreases or the set point is decreased (as noted above, the set point may be varied by the system controller as the load requirements vary for the given application), $V_{OUT}$ becomes temporarily larger than the set point. In such a situation, it is necessary to sink current to discharge the load capacitor 118. The switching regulator 30 allows for the sinking of current in this situation.

More specifically, referring again to FIG. 4, assuming the set point has been lowered, the switching regulator 30 still functions as detailed above. However, in this situation, as the "$H_{ON}$" state is entered, the output of the first comparator 34, E COMPARE, is TRUE so that at the end of the blanking delay period, the output of the D-FF becomes TRUE and the EN NEGISENSE signal of the ISENSE circuit becomes TRUE. As such, the current measuring circuit 32 operates to measure current flowing from the drain to the source of the PMOS transistor 114. Also, since the current from the error amplifier 38 is making the loop filter voltage less positive, the output of the second comparator 36, I COMPARE, quickly becomes TRUE if not already TRUE and the switching regulator 30 advances to the "$L_{EN}$" state.

In the "$L_{EN}$" state, since both the NEGI signal and ENABLE ACTIVE DIODE signal are asserted (i.e., TRUE), the FORCE LON signal is TRUE. As a result of the FORCE LON signal being active (i.e., TRUE), the transistor 18 of the active diode 10 is turned ON, rapidly decreasing the inductor current until the active diode 10 is disabled again upon receipt of the next clock pulse (i.e., the timing signal from the CLOCK (or cycle timer)), which causes the switching regulator 30 to advance to "$L_{OFF}$" state. In the $L_{OFF}$ state, the FORCE LON signal and ENABLE ACTIVE DIODE signal are FALSE, the signal active diode ON becomes FALSE and the state of the switching regulator advances to "IDLE" and then the cycle repeats. It is noted that as long as $V_{OUT}$ remains above the set point, E COMPARE remains TRUE in "$H_{ON}$" and the previous conditions repeat with the positive switch current being only a very narrow pulse. However, the inductor current is large and negative causing a negative high side switch current to flow when the low side transistor 18 turns OFF. Eventually, after some number of cycles, $V_{OUT}$ reaches the desired set point, and E COMPARE becomes FALSE and the initial sequence described previously (where $V_{OUT}$ does not exceed the set point) is restored.

Figure 5A:
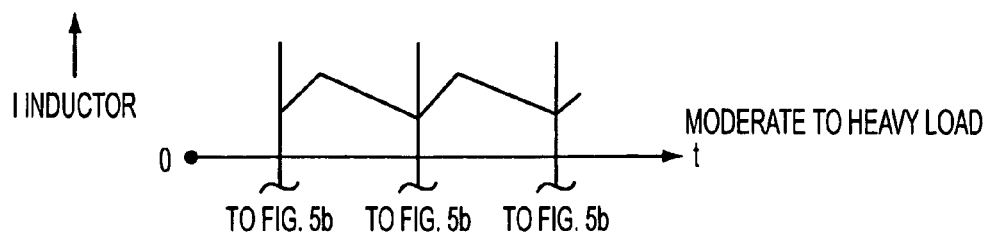
Figure 5B:
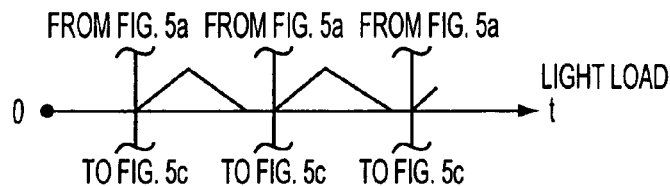
Figure 5C:
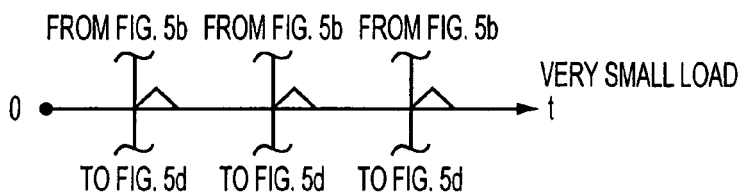
Figure 5D:
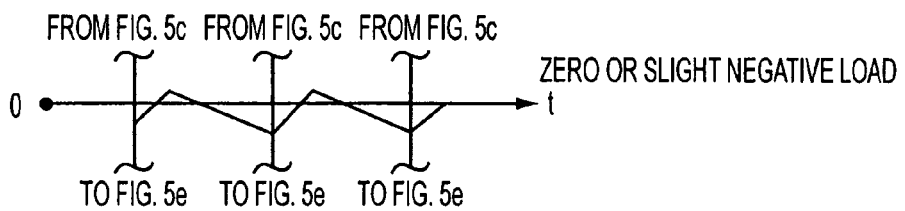
Figure 5E:
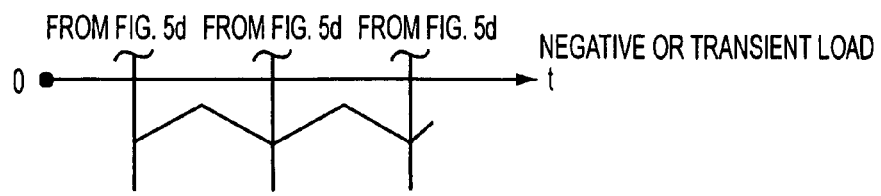

FIGS. 5a-5e illustrate exemplary inductor currents during two successive control cycles for the various load conditions discussed above. As is shown in FIG. 5a, at large load the inductor current is continuous (i.e., the inductor current does not go to zero) with small magnitude ripple due to the allowed choice of L and C values. FIG. 5b illustrates a moderate load condition in which the inductor current becomes slightly discontinuous where the efficiency improves over that of the continuous current mode and the peak ripple becomes smaller. At very light loads, such as shown in FIG. 5c, the efficiency is further improved, ripple is smaller, but no cycle skipping or low repetition rate burst mode occurs. During negative load transients or steady state sourcing loads, such as shown in FIGS. 5d and 5e, respectively, the inductor current can become negative and even full continuous as required for regulation.

As noted above, the switching regulator of the present invention provides numerous advantages over the prior art. One such advantage of the present invention is that it provides a cost effective switching regulator that allows for operation at small load currents without a significant reduction in efficiency. As explained herein, this is accomplished in-part by utilizing an active diode function including control and sense signals in place of the synchronously driven low-side switch found in typical prior art devices, and by utilizing a high side current sense circuit that responds to both positive and negative currents.

Another advantage of the present invention is that it allows for numerous of the active components contained therein to be powered-off during portions of the operation cycle thereby reducing the power requirements and further improving overall efficiency.

In addition, even at small load currents, there is at most one $H_{ON}$ high side switch activation and it can occur only at the start of each clock cycle. As contrasted to a "burst" mode of operation where there is a rapid sequence of multiple high side switch activations followed by a "sleep" interval when all functions are powered OFF, the operation of the present invention results in a significantly more compact frequency spectrum of switching noise and much smaller deviations of $V_{OUT}$ from its set point.

It is noted that one of the key benefits of the present invention is the ability to regulate the peak value of inductor current, even when the polarity of the inductor current is negative, without requiring a substantial amount of circuitry to accomplish this task, and without requiring the need for negative supply voltages. One aspect of the present invention that allows for the foregoing to be accomplished is making the voltage reference level in the loop filter for zero load current and the current sense output termination a positive value ($V_{REF}$) as opposed to 0V as is typically done in known devices. While the system of the present invention remains BUCK (i.e., a step-down converter) such that instantaneous $V_{OUT}$ must be between zero and $V_{CC}$, during transients the error amplifier 38 and current sense circuit 32 output currents can be negative when $V_{OUT}$ is greater than the set point and the controller still operates in the standard manner while sinking currents from the output load. It is specifically noted that the $I_{SENSE}$ current signal generated by current sensing circuit 32 is positive for positive inductor current and negative for negative inductor current.

In other words, in accordance with the present invention, the system always regulates the positive peak of the inductor current even when the actual value of the inductor current peak is in the negative direction. As noted, this is accomplished in-part by retaining the negative direction of the sensed current when the actual current is negative. This allows a decaying magnitude of negative current to be sensed by its increasing value in the $I_{COMPARE}$ comparator without requiring any modifications of the comparator (i.e., $I_{COMPARE}$ identifies the most positive peak of the inductor current by comparing the peak in all cases directly with the loop filter voltage even when the most positive peak has a negative value). As described above, the components which provide for the foregoing operation include the current sense circuit 32, the terminations on the current sense circuit, and the error amplifier 38. These components operate such that the signal generated corresponding to a zero load current is a positive value (as opposed to zero volts as is typically utilized). As a result, when the load current goes negative, the signal generated with respect to the reference is still a value above ground (i.e., positive) which can be processed in the same manner as the other positive signals.

While specific embodiments of, and examples for, the invention are described herein for illustrative purposes, various equivalent modifications are possible within the scope of the invention, as those skilled in the relevant art will recognize.

One such modification is to further include a safety circuit to prevent component damage in the event the load becomes shorted.

Another possible modification is to provide a circuit which operates to reduce output ripple voltage when $V_{IN}$ is substantially equal to the set point for $V_{OUT}$ and $H_{ON}$ lasts more than one clock period (i.e., 100% duty cycle) in order to regulate.

Another possible modification would be to include a slope compensation circuit to allow operation at duty cycles greater than 50% when required by the values of input voltage relative to output voltage and the size of the load.

Yet another modification would be to include a non-linear limiter in the loop filter to reduce startup transient overshoot on very light load.

Yet another possible modification would be to provide means for synchronizing with an external clock as opposed to utilizing the internal clock discussed above.

It is noted that the aforementioned variation are merely examples. Further, the terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A switching regulator comprising:
   a high side switch;
   a low side switch comprising an active diode;
   a controller coupled to said high side switch and said low side switch, said controller governing the operational state of said high side switch and said low side switch during operation of said switching regulator; and
   a current measuring circuit coupled to said high side switch, said current measuring circuit capable of measuring current flowing through said high side switch in both a positive and a negative direction.

2. The switching regulator of claim 1, further comprising:
   an error amplifier having a first input for receiving a signal indicative of the desired output voltage of said switching regulator and a second input for receiving a signal indicative of an output voltage level of said switching regulator, said error amplifier generating a first output and a second output signal, each of which is indicative of the difference between the desired output voltage and the output voltage level of said switching regulator.

3. The switching regulator of claim 2, further comprising:
   a first comparator having a first input for receiving said first output signal of said error amplifier, and a second input for receiving a reference voltage, said first comparator operable for asserting a first logic output signal when said output voltage is greater than said desired output voltage.

4. The switching regulator of claim 3, further comprising:
   a second comparator having a first input for receiving said second output signal of said error amplifier, and a second input for receiving an output of said current measuring circuit, said second comparator operable for asserting a second logic output signal when said second output signal from said error amplifier combined with an average of signals previously output by said error amplifier is a level which is less than said output of said current measuring circuit.

5. The switching regulator of claim 4, wherein said first output signal of said error amplifier input into said first input of said first comparator receives represents an instantaneous value of the difference between the desired output voltage and the output voltage level of said switching regulator.

6. The switching regulator of claim 2, wherein said first output signal of said error amplifier and said second output signal of said error amplifier have quantities that are proportional to one another.

7. The switching regulator of claim 2, wherein said first output signal of said error amplifier and said second output signal of said error amplifier are equal to one another.

8. The switching regulator of claim 4, further comprising a loop filter coupled to said first input of said second comparator, said loop filtering generating said average of signals previously output by said error amplifier.

9. The switching regulator of claim 4, further comprising a terminating impedance and a reference voltage disposed between the output of said current measuring circuit and said second input of said second comparator.

10. The switching regulator of claim 4, further comprising a terminating impedance and a reference coupled to said first input of said first comparator.

11. The switching regulator of claim 2, wherein said first output signal and said second output signal of said error amplifier are current signals.

12. The switching regulator of claim 1, wherein said active diode comprises:
  a transistor having a first terminal, a second terminal and a control terminal;
  an amplifier having a non-inverting input terminal and an inverting input terminal, and an output terminal, said non-inverting input terminal being connected to said first terminal of said transistor via an offset bias source, said inverting input terminal being connected to said second terminal of said transistor;
  a summer circuit having a first input for receiving a control signal from said controller and a second input for receiving an output signal from said amplifier; and
  a driver circuit having an input for receiving the output of said summer circuit, and an output coupled to said control terminal of said transistor, said driver circuit operable for controlling the operation of said transistor based on the output of said summer circuit.

13. The switching regulator of claim 12, wherein the voltage between said first terminal of said transistor and said second terminal of said transistor is maintained at the voltage of said offset bias voltage source when forward current flows from said first terminal of said transistor to said second terminal of said transistor.

14. The switching regulator of claim 12, wherein said amplifier senses the voltage difference between said first terminal of said transistor and said second terminal of said transistor and generates said output signal in accordance with the voltage difference.

15. The switching regulator of claim 12, wherein said controller is capable of activating said transistor by forwarding said control signal to said summer circuit.

16. The switching regulator of claim 4, wherein each of said current measuring circuit, said error amplifier, said active diode, said first comparator and said second comparator are activated by said controller during operation of said switching regulator when necessary, said controller activating a given device by forwarding an enable control signal to the given device.

17. The switching regulator of claim 12, wherein said driver circuit generates an output status signal indicating the state of said transistor, said output status signal being coupled to said controller.

18. The switching regulator of claim 1, wherein said current measuring circuit measures current flowing through said high side switch in a positive direction when a first control enable signal is forwarded by said controller, and measures current flowing through said high side switch in a negative direction when a second control enable signal is forwarded by said controller.

19. The switching regulator of claim 1, wherein said current measuring circuit generates an output current signal which is proportional to the amount of current flowing through said high side switch.

20. The switching regulator of claim 19, wherein said output current signal is a positive current signal when current is flowing through said high side switch in a positive direction, and said output current signal is a negative current signal when current is flowing through said high side switch in a negative direction.

21. The switching regulator of claim 1, wherein further comprising:
  an inductor and a capacitor coupled between said high side switch and said low side switch, and
  a load coupled in parallel with said capacitor.

22. The switching regulator of claim 1, wherein a positive voltage level is utilized to represent a load supply current of zero.

23. The switching regulator of claim 9, wherein a positive voltage level is utilized to represent a load supply current of zero.

24. A switching regulator for regulating an output voltage, said switching regulator including:
  a high side switch;
  a low side switch comprising an active diode,
  a controller coupled to said high side switch and said low side switch, and
  a current measuring circuit coupled to said high side switch,
  wherein said switching regulator is operative for measuring said output voltage and if said output voltage is below a desired level, activating said high side switch so as to provide current to a load via an inductor, if said voltage is above said desired level, activating said low side switch so as to sink current from said load via said inductor;
  said current measuring circuit is operative for measuring the current flowing through said high side switch in either a positive direction or a negative direction; and
  said controller is operative for controlling said current measuring circuit, and disabling active components contained in said current measuring circuit and said active diode when said active components are not utilized during operation of said switching regulator so as to reduce operational power requirements of said switching regulator.

25. The switching regulator of claim 24, wherein a positive voltage level is utilized to represent a load supply current of zero.

26. A method of regulating an output voltage by utilizing a switching regulator, said switching regulator including a high side switch, a low side switch comprising an active diode, a controller coupled to said high side switch and said low side switch, and a current measuring circuit coupled to said high side switch, said method comprising the steps of:

measuring said output voltage and if said output voltage is below a desired level, activating said high side switch so as to provide current to a load via an inductor, if said voltage is above said desired level, activating said low side switch so as to sink current from said load via said inductor; and utilizing said current measuring circuit to measure the current flowing through said high side switch in either a positive direction or a negative direction, wherein said controller is operable for controlling said current measuring circuit; and disabling active components contained in said current measuring circuit and said active diode when said active components are not utilized during operation of said switching regulator so as to reduce operational power requirements of said switching regulator.

27. The method of regulating an output voltage according to claim 26, further comprising the steps of:

generating a first output signal indicative of the difference between the desired output voltage and the output voltage level of said switching regulator, said first output signal being generated by an error amplifier;

generating a second output signal when said output voltage is greater than said desired output voltage, said second output signal being generated by a first comparator;

generating a third output signal when the output of said current measuring circuit is greater than a combination of the present and average of previous values output by an error amplifier, said third output signal being generated by a second comparator, said error amplifier, said first comparator and said second comparator being disabled when not being utilized during operation of said switching regulator so as to reduce operational power requirements of said switching regulator.

28. The method of regulating an output voltage according to claim 27, wherein said controller enables a given device by forwarding an enable control signal to the given device.

29. The method of regulating an output voltage according to claim 27, further comprising the step of generating an output status signal indicating the state of said low side switch, said output status signal being coupled to said controller.

30. The method of regulating an output voltage according to claim 26, wherein a positive voltage level is utilized to represent a load supply current of zero.

* * * * *